United States Patent
Merchant et al.

[19]

[11] Patent Number: 5,831,636
[45] Date of Patent: Nov. 3, 1998

[54] METHOD FOR COMPRESSING IDEOGRAPHIC CHARACTERS FOR STORAGE DECOMPRESSION AND DISPLAY AND A COMMUNICATION DEVICE THEREFOR

[75] Inventors: Zaffer S. Merchant, Parkland; Warren P. Glotzbach, West Palm Beach; Surendra J. Perera, Boynton Beach, all of Fla.

[73] Assignee: Motorola, Schaumburg, Ill.

[21] Appl. No.: 756,466

[22] Filed: Nov. 26, 1996

[51] Int. Cl.⁶ ........................................... G06F 3/14
[52] U.S. Cl. .............................. 345/467; 707/535
[58] Field of Search ..................... 345/467, 468, 345/144, 470, 471, 141; 707/536, 535, 530; 400/110

[56] References Cited

U.S. PATENT DOCUMENTS

| | | | |
|---|---|---|---|
| 4,881,069 | 11/1989 | Kameda et al. | 345/471 |
| 4,896,147 | 1/1990 | Futakata | 345/129 |
| 5,027,304 | 6/1991 | Jeng et al. | 345/170 |
| 5,109,352 | 4/1992 | O'Dell | 707/542 |
| 5,119,296 | 6/1992 | Zheng et al. | 707/535 |
| 5,131,766 | 7/1992 | Wong | 400/110 |
| 5,212,769 | 5/1993 | Pong | 345/467 |
| 5,295,240 | 3/1994 | Kajimoto | 345/472 |
| 5,305,207 | 4/1994 | Chiu | 707/535 |
| 5,305,433 | 4/1994 | Ohno | 345/469 |
| 5,468,077 | 11/1995 | Motokado et al. | 400/76 |
| 5,526,477 | 6/1996 | McConnell et al. | 345/467 |

*Primary Examiner*—Stephen S. Hong
*Attorney, Agent, or Firm*—Pedro P. Hernandez

[57] ABSTRACT

A compression/decompression method useful in communicating ideographic characters to communication devices. An ideographic character is represented by a compressed character codeword including information defining a structure type or layout of the character, together with primitive types that represent combinations of simple graphical elements. A character generator read-only memory (CGROM) (20) includes a compressed character codeword database (22) and a primitive type database (24). Character codes corresponding to a compressed character codeword are transmitted to a communication device (600), such as a selective call receiver. The communication device (600) includes a microprocessor/controller (50) that decompresses the compressed character codewords corresponding to the character codes based on the data stored in the character database (22) and the primitive type database (24).

19 Claims, 6 Drawing Sheets

STROKES

*FIG. 1*

PRIMITIVES

*FIG. 2*

STRUCTURES

*FIG. 3*

CHARACTERS

METHOD FOR COMPRESSING IDEOGRAPHIC CHARACTERS FOR STORAGE DECOMPRESSION AND DISPLAY AND A COMMUNICATION DEVICE THEREFOR

FIELD OF THE INVENTION

The present invention is directed to communication devices, and more particularly to a method and apparatus for more efficiently storing and decompressing complex ideographic character information.

BACKGROUND OF THE INVENTION

Communication of textual messages between remotely located devices is very useful, and has proliferated greatly in the radio paging industry. Alphanumeric pagers are widely used to communicate textual messages to subscribers. Two-way paging has been introduced to allow subscribers to answer or respond to text messages, as an alternative to mobile cellular communications.

Processing information representative of characters in certain languages has become a challenge due to the complexity of certain character sets. For example, languages which use Chinese characters require a way to represent up to several thousand characters. This places a burden on the storage and processing capability of a portable communication device.

Compression of Chinese characters for storage in a communication device is complicated by at least two factors. First, the decompression method needs to allow for random access of individual characters for fast display by a user. Second, the size of the data to be stored in the communication device should be minimized to allow storage of both the compressed data and the program, data and/or tables needed to decompress the characters. These two requirements place severe restrictions on the viable approaches for the field of radio paging, and eliminates the utility of most general purpose file compression methods, such as Huffman/Arithmetic coding and Lempel-Ziv-type coding.

The conventional way to achieve compression of binary or ASCII data is to use Huffman/Arithmetic coding or Lempel-Ziv type techniques. The main problem with these techniques is that the codewords are variable length and therefore the character boundaries are not explicitly known. This is especially a problem for a character generator read-only-memory (ROM) since the application requires random access of each character to be displayed.

A method for compression and decompression of ideographic characters is proposed that will achieve both fast decompression and significantly reduce the memory space required for storing the information necessary to decompress the compressed ideographic character information.

DETAILED DESCRIPTION OF THE DRAWINGS

The present invention is directed to a method and apparatus for compressing and decompressing complex graphical information, such as ideographic characters. The present invention has utility in processing ideographic character sets, particularly those that include complex ideographic characters, such as Chinese characters.

The compression/decompression method and apparatus according to the present invention is based on a hierarchical decomposition of an ideographic character into lower level descriptions. For example, Chinese characters can be generated from a small defined set of strokes, for example. The strokes form simple primitives and characters, which are then combined in different ways to form more complex characters in much the same way as strokes, letters and words are generated with the English language alphabet.

Figure 1:
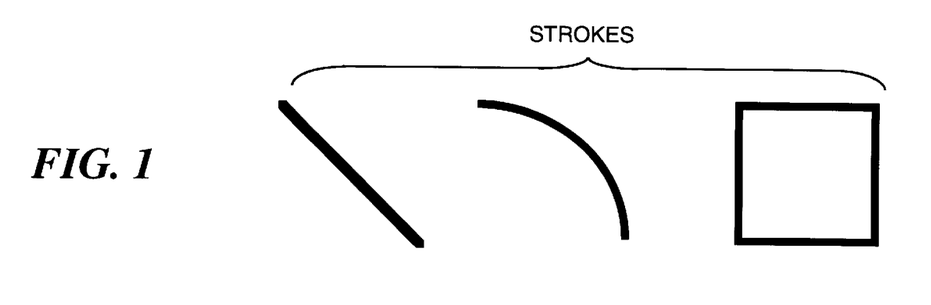
FIG. 1 is a diagram showing the basic graphical elements called "strokes" used in defining ideographic characters, in accordance with the present invention.

Referring to FIGS. 1–4, three levels are defined for compressing and subsequently reconstructing an ideographic character. These are: strokes, primitives and characters. The strokes, shown in FIG. 1, consist of three main types: straight lines, curved lines and closed geometrical shapes or boxes. Each stroke type represents a simple graphical element having a single pixel thickness. FIG. 1 shows, as an example, strokes useful in a representing a Chinese character set. Each stroke type has an associated drawing sub-routine stored in a memory to cause a microprocessor, for example, to draw the stroke. There may be any number of stroke types that are useful to represent characters of a particular character set. The strokes shown in FIG. 1 are for illustrative purposes, and are not meant to be exhaustive.

Figure 2:
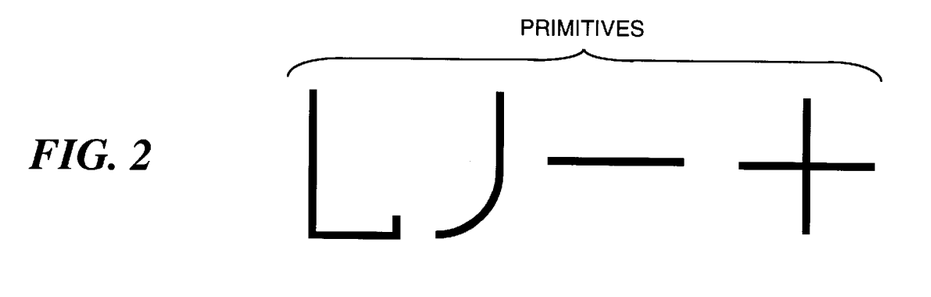
FIG. 2 is a diagram showing combinations of strokes which are used in defining "primitives", in accordance with the present invention.

As shown in FIG. 2, a primitive consists of combinations of strokes. Primitives are symbols that are determined by language knowledge and by studying the makeup of characters in a particular character set. With few exceptions, all of the primitives in the example shown in FIG. 2 can be represented as combinations of strokes. Symbols of high complexity are represented as bit map images and are scaled using image down sampling for reconstruction, as opposed to vector strokes, while still achieving significant compression at the character level.

Figure 3:
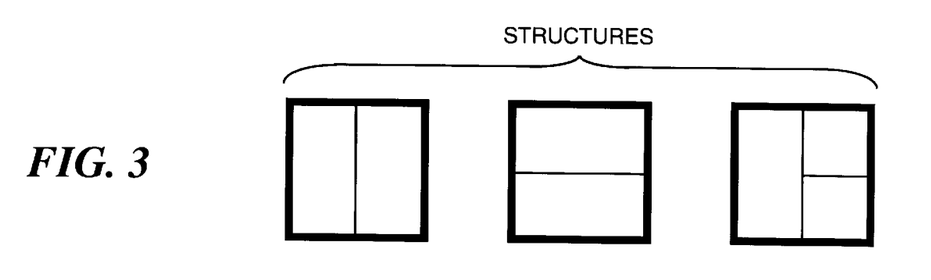
FIG. 3 is a diagram showing various "structures" used to define the spatial orientation or layout of primitives in an ideographic character.

Each character is described by its shape or structure, the primitives or characters that fit into the structure, and their dimensions. As shown in FIG. 3, a set of structure types are defined that describe the "floor plan" or spatial orientation of the primitives that make up a character. The structure type defines where the strokes or primitives reside in relation to each other for a character.

Figure 4:
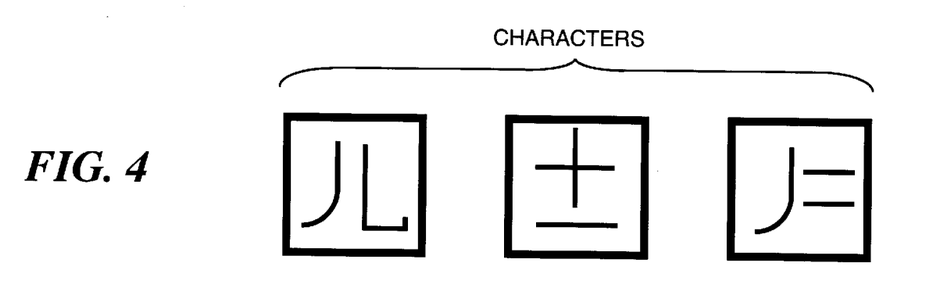
FIG. 4 is a diagram showing examples of ideographic characters built from information representing the structures and primitives.

Examples of characters are shown in FIG. 4. Characters are made up of primitive type and structure type information, together with dimension information, and also of other characters. Thus, in some cases characters can be defined in terms of other characters (constituent characters), thereby using less information than a representation which uses primitive types and structure types.

Figure 5:
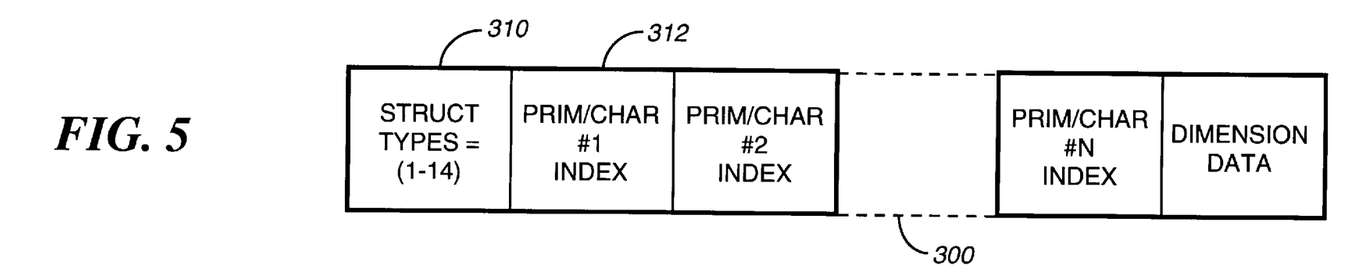
FIGS. 5–7 are a diagrams showing formats of a compressed character codeword used to representing ideographic characters in accordance with the present invention.
Figure 6:
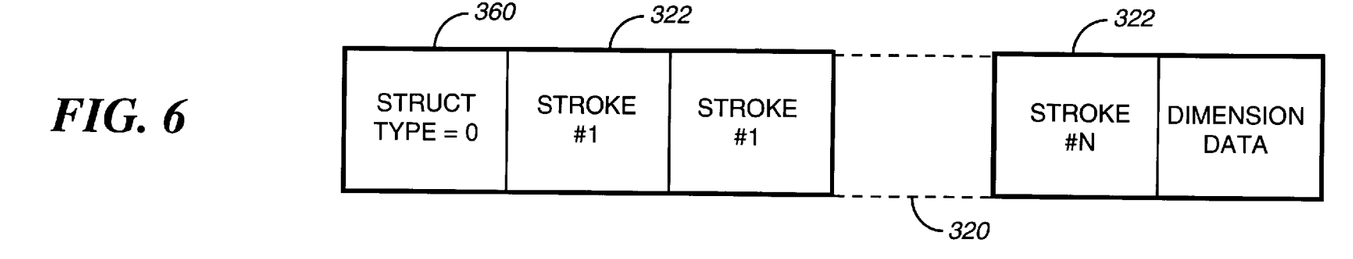
Figure 7:
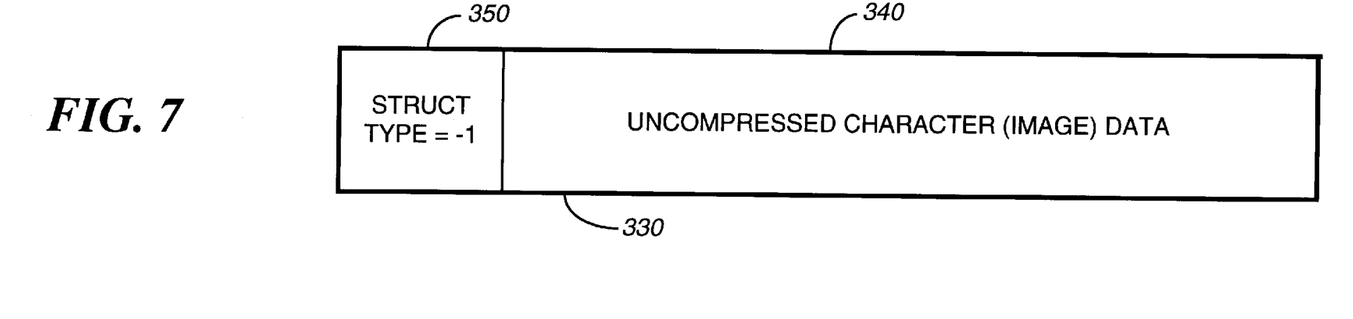

Turning now to FIGS. 5–7, the coding formats for representing an ideographic character is described. A compressed character codeword is a digital word encoded to represent a particular ideographic character of a character set. FIG. 5 shows one format of a compressed character codeword 300 which includes structure type information 310 followed by one or more primitive indexes or compressed character indexes 312. Each compressed character codeword of this format includes a structure type within a particular range, 1–14 for example (numeric equivalent of binary pattern), followed by one or more primitive type indexes or character type indexes that fit into the floor plans defined by the structure types 1–14. Some character codewords are larger than others, depending on the particular ideographic character which it represents and more specifically the number of constituent primitives or characters.

Indeed, some characters can be defined in terms of other characters. That is, the compressed character codeword for a particular ideographic character may include a compressed character index for another compressed character codeword (called a constituent compressed character codeword) corresponding to a constituent character which forms a part of the particular ideographic character, as well as other primitive types or possibly yet other constituent characters.

FIG. 6 illustrates a compressed character codeword 320 of structure type "0" that defines a character in terms of stroke types only. One or more stroke type portions 322 follow the structure type portion 360. Certain characters are better represented in the format shown in FIG. 6, where simple graphical elements (that can be represented by strokes) make up the character.

FIG. 7 illustrates the case when a character cannot efficiently be represented by compressed data according to this compression scheme. In such a case, the character is represented by a compressed character codeword 330 that comprises a portion 340 for uncompressed bit map image data. The structure type 350 for the compressed character codeword 330 is assigned a value of "−1".

It should be apparent that a compressed character codeword is variable in size and also in content. The structure type information determines whether the remainder of the codeword contains primitive type indexes or compressed character indexes (for structure types 1–14); whether the codeword contains stroke type information (for structure type 0); or whether the codeword contains uncompressed bit map image data (for structure type −1).

The dimension data in a compressed character codeword defines the position of divider lines of the floor plan or structure type of the character. Specifically, referring to FIG. 3, the dimension data specifies where the divider lines reside in the overall area (called "character window") of the character for each stroke or primitive that is to fit into that portion of the character window. Consequently, the dimension data sets the size of each area where a stroke or primitive fits.

The compressed character codeword formats shown in FIGS. 5–7 enable representation of many different types of character sets. For Chinese ideographic characters, for example, the structure type is represented by four bits, the primitive type is represented by nine bits and the dimension data for a character is represented by ten bits. Thus, for many characters, 4 bytes of 8 bit data can represent a character. By comparison, the data needed to represent a bit map image of a 16 pixel by 16 pixel Chinese character would require 256 bits, or 32 bytes of 8 bits. The compression achieved by the present invention is 8 times better than that where full bit map image data is used to represent a character. Moreover, many characters that would appear to require multiple primitive types (multiple symbols), thus increasing the size of the compressed character codeword, can be represented in terms of another character (a single symbol), allowing for still better compression according to the present invention.

Figure 8:
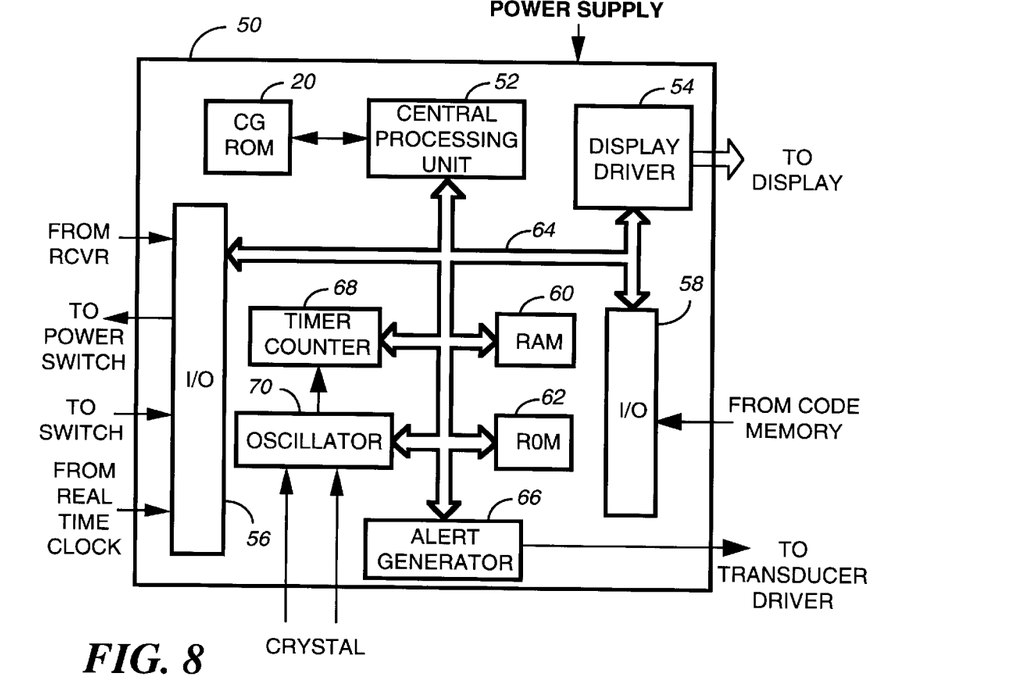
FIG. 8 is a block diagram of a microprocessor controller used in a device that is to decompress information representing a compressed ideographic character in accordance with the present invention.

FIG. 8 shows a microprocessor/controller 50 useful in a communication device, such as a selective call receiver, to process received data including compressed ideographic information for display, storage or other output. The microprocessor 50 comprises a character generator read-only memory (CGROM 20) (or alternatively the CGROM 20 is external to the microprocessor 50), a central processing unit 52, a display driver 54, an input/output port 56, an input/output port 58, a random-access-memory (RAM) 60, a ROM 62, a bus 64, an alert generator (optional) 66, a timer counter 68 and an oscillator 70. The central processing unit 52 is coupled to the CGROM 20 and also is coupled via the bus 64 to the display driver 54. The display driver 54 is coupled to a display device (not shown in FIG. 8), such as an LCD screen or other display device. The RAM 60 and ROM 62 store information useful for controlling the operation of the central processing unit 52, as is well known in the art, including sub-routines for controlling access to, and processing of data from, the CGROM 20. The timing of the microprocessor 50 is controlled by the oscillator 70 and timer counter 68. The sub-routines for drawing a graphical element of a stroke are stored in primitive type database 24 and executed by the central processing unit 52 in cooperation with the display driver 54 in order to display a character.

Information that is received by a communication device, such as by a receiver circuit of a wireless communication receiver, is coupled to microprocessor via the input/output port 56. In the case of the present invention, this information includes a character code representing a compressed character codeword stored in the CGROM 20. The central processing unit 52 processes the information stored in the CGROM 20 in order to supply information to the display driver 54 for displaying one, or a string of, ideographic character(s) represented by the received character index(es).

Figure 9:
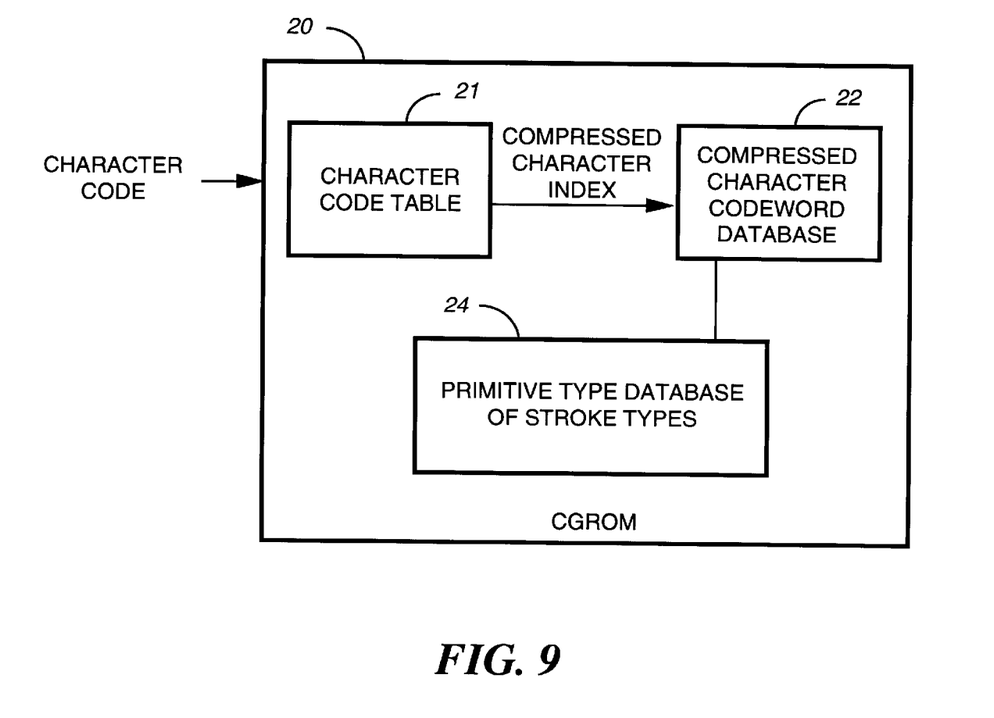
FIG. 9 is a block diagram of a character generator read-only-memory, including databases for compressed character codewords and primitive types, according to the present invention.

Turning to FIG. 9, the CGROM 20 includes a character code table 21 that translates the received character code to a corresponding compressed character index in the compressed character codeword database 22 for the corresponding compressed character codeword. Thus, each compressed character codeword has a corresponding compressed character index. A character code is, for example, a 14 bit code that maps to a compressed character index. The primitive types are stored in the primitive type database 24 with a corresponding primitive index. As mentioned above, the primitive database includes the sub-routines that are used to draw the graphical elements of the stroke types. Alternatively, the primitive database 24 includes calls to the drawing sub-routines, and the sub-routines themselves are stored in the RAM 60 or ROM 62, or another memory.

Figure 10:
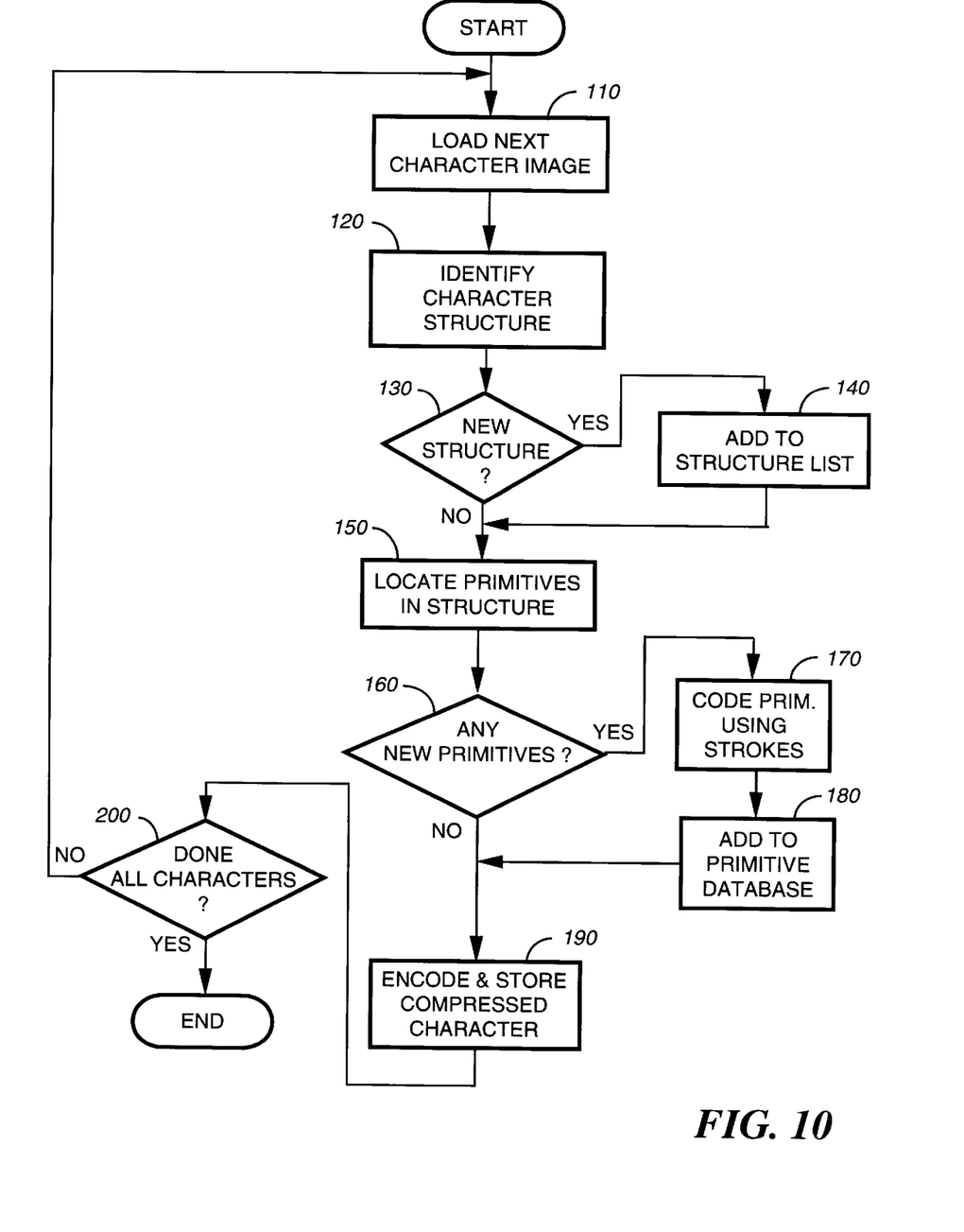
FIG. 10 is a flow chart diagram showing a process for generating the character database, in accordance with the present invention.

FIG. 10 shows a process for generating the compressed character codeword database. This process is performed only one time for each character set and then once completed, the database is stored in the communication device for use in decompressing compressed ideographic character information. Beforehand, a study is made of the character set in order to generate basic parameters for structure types, stroke types and primitive types for the character set. In step 110, a character image is loaded and in step 120, its structure type is identified or determined. If, in step 130, it is determined that the structure type is new, that is, one that is not previously defined for the character set, then in step 140, the new structure type is added to the list of possible structure types. Next, in step 150, the primitives for the character image are located in the structure type that has been identified in step 120. Again, in step 160, if the primitives are new, then they are defined and encoded in step 170 using strokes and are added to the primitive database in step 180. Finally, in step 190, the compressed character codeword is encoded and stored in a buffer or database. In step 200, a check is made to determine whether the entire character set has been processed, in order to repeat the procedure from step 110 for additional characters in the set.

As described in conjunction with FIG. 9, each compressed character codeword is assigned a character code for purposes of transmitting a smaller amount of data over the air, for example. The character codes for all of the characters in a character set are stored in the character code table 21. The compressed character index for the compressed character codeword in the compressed character codeword database 22 is mapped to a character code in the character code table 21.

Figure 11:
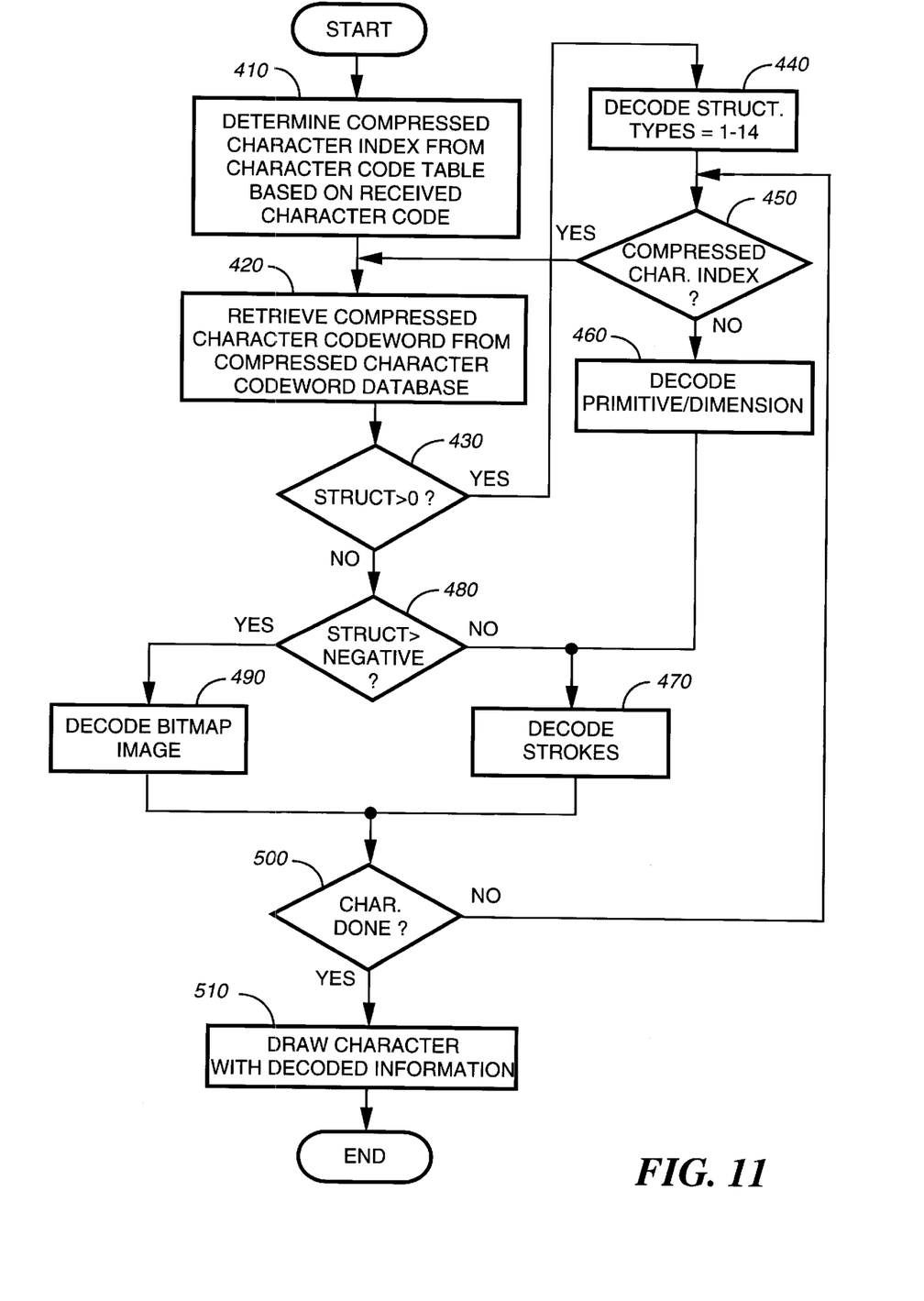
FIG. 11 is flow chart diagram showing the decompression process of compressed ideographic character information in accordance with the present invention.

With reference to FIGS. 9 and 11, the procedure for decoding or decompressing compressed ideographic information is described. In step 410, when a character code is received, the compressed character index for that character is determined from the character code table 21. In step 420, with the compressed character index, the corresponding compressed character codeword is retrieved from the compressed character codeword database 22 of the CGROM 20. Next, in step 430, the structure type portion of the compressed character codeword is examined. If the value of the structure type portion of the compressed character codeword has a positive value, then the process continues to step 440. In step 440, the structure type is decoded in order to determine the spatial orientation or floor plan for the character. In step 450, it is determined whether the next portion of the compressed character codeword is a compressed character index. If so, then the process continues from step 420. Otherwise, the process continues to step 460 where the primitive type index and dimension data portions of the compressed character codeword are decoded using the primitive type database 24. After step 460, the process continues to step 470 where the strokes defined in the primitive type database are decoded according to the structure type information decoded previously in step 440. In step 500, a check is made to verify that the character is completely decoded (that there are no remaining constituent characters or primitives in the compressed character codeword), and if so in step 510, the decoded information is used to construct or draw the character on a display, with the cooperation of a display driver. Otherwise, the process continues from step 450.

If in step 430, the value of the structure type is not positive, then the process continues to step 480 to determine whether its value is negative, indicative of a bit map image, or is zero, indicative of a character defined in terms of strokes (if its value is zero). Thus, the process continues to step 470 or 490 depending on the determination made in step 480. In step 470, the strokes are decoded, or in step 490, the bit map image data of the compressed character codeword is decoded. The decoded information is then used to draw the character in step 510 if there are no further parts (additional characters or primitives) to decode for the character.

Figure 12:
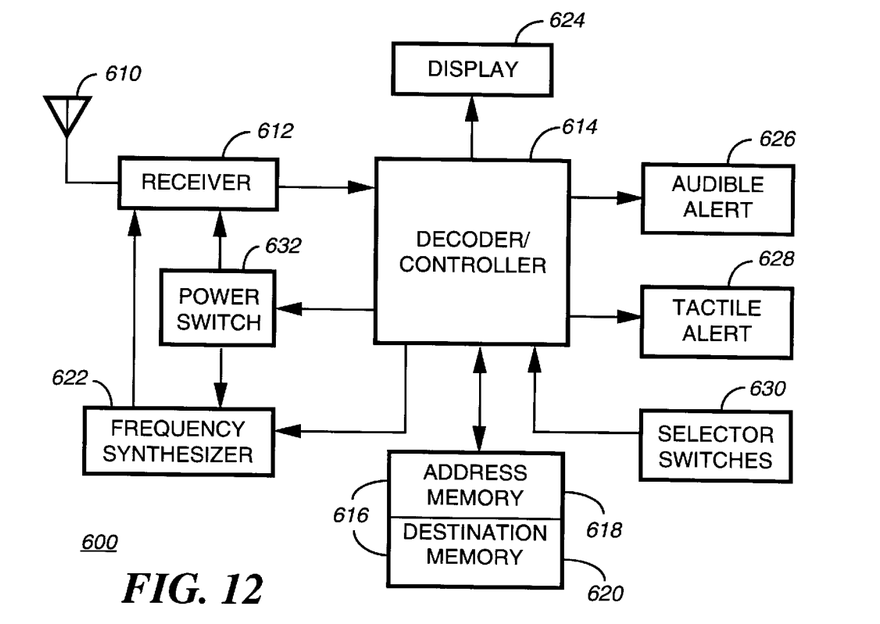
FIG. 12 is a block diagram of a communication device suitable for decompressing compressed ideographic character information in accordance with the present invention.

The character compression (encoding) and decompression (decoding) scheme of the present invention has utility in a variety of applications including, telephonic (wired) communication via modems between computers, portable data assistants, etc., as well as in wireless communications, such as pagers (one-way and two-way), cellular phone systems with messaging capability and other devices that have such communication functionality. FIG. 12 shows a selective call receiver or pager 600 as an example of a wireless communication device. The selective call receiver 600 comprises an antenna 610 coupled to a receiver 612. The receiver is in turn coupled to a decoder/controller 614 that includes, for example, a microprocessor controller such as that shown in FIG. 10. A codeplug memory 616 is coupled to the decoder/controller 614 and includes an address memory 618 and a destination memory 620 as is well known in the art. The selective call receiver is, for example, capable of receiving radio frequency (RF) signals on multiple frequencies, and thus includes a frequency synthesizer 622. Information that is received by the receiver 612 and decoded by the decoder/controller 614 is displayed on the display 624. Alert functions, controlled by the decoder/controller 614 are performed by the audible alert 626 or the tactile alert 628. User input into the selective call receiver is through one or more buttons or selector switches 630. Power savings for the device is controlled by the decoder/controller 614 via the power switch 632 to shut down the receiver 612 during times when a signal for the selective call receiver 600 is not expected to be received. Information such as ideographic characters are modulated on a radio-frequency signal that is received by the receiver 612 and demodulated for processing by the decoder/controller 614. The compressed information that represents the ideographic characters (as well as other information) is decompressed by the decoder/controller 614 for display on the display 624.

It is appreciated that the functionality of a selective call receiver 600 may be integrated into higher level devices, such as desktop computers, laptop computers, portable data assistances, cellular telephones, etc.

The present invention provides a method and apparatus for minimizing the amount of information needed to represent a character set, thus reducing the amount of information required to decompress the character information for display or other output (printing, etc.).

The above description is intended by way of example only, and is not intended to limit the present invention in any way, except as set forth in the following claims.

What is claimed is:

1. A method for processing data representing an ideographic character in a communication device, the method comprising steps of:

storing in the communication device a compressed character codeword database comprising a plurality of compressed character codewords comprising a structure type and at least one of: (a) a primitive type; (b) a compressed character index; or (c) a stroke type, and wherein each compressed character codeword has a corresponding character code;

storing in the communication device a primitive database comprising a plurality of primitive types, each primitive type comprised of one or more stroke types that define individual graphical elements;

receiving a character code;

generating an ideographic character corresponding to the character code that is received, comprising steps of:
(a) determining a compressed character codeword in the compressed character codeword database corresponding to the character code that is received;
(b) decoding the structure type from the compressed character codeword determined in step (a) to determine a layout of the ideographic character;
(c) decoding a remainder of the compressed character codeword depending on the structure type determined in step (b); and
(d) constructing the ideographic character corresponding to the character code that is received by arranging at least one graphical element into the layout defined by the structure type.

2. The method of claim 1, wherein when the structure type determined in step (b) indicates that the compressed character codeword comprises one or more primitive types or compressed character indexes, step (c) further comprising steps of:

decoding the primitive type in the compressed character codeword to determine at least one stroke type defined by the primitive type; and decoding the stroke type to determine at least one graphical element.

3. The method of claim 1, wherein the compressed character codeword corresponding to the character code that is received includes at least one compressed character index corresponding to a constituent compressed character codeword, and wherein step (c) further comprises decoding the constituent compressed character codeword.

4. The method of claim 3, wherein the step of decoding the constituent compressed character codeword further comprises steps of:

determining a primitive type included in the constituent compressed character codeword;

decoding the primitive type to determine at least one stroke type defined by the primitive type; and decoding the stroke type to determine at least one graphical element.

5. The method of claim 1, wherein when the structure type determined in step (b) indicates that the compressed character codeword comprises at least one stroke type, step (c) comprises decoding the at least one stroke type to determine at least one graphical element.

6. The method of claim 1, wherein when the structure type determined in step (b) indicates that the compressed character codeword comprises bit map image data, step (c) comprises decoding the bit map image data to generate data for drawing the ideographic character.

7. The method of claim 1, and further comprising a step of displaying the ideographic character corresponding to the character code that is received.

8. The method of claim 1 wherein each stroke type comprises a simple graphical element of single pixel thickness.

9. A communication device comprising:

a receiver for receiving information including at least one character code corresponding to a compressed character codeword;

a memory storing a compressed character codeword database comprising a plurality of compressed character codewords, each compressed character codeword comprising a structure type and one or more primitive types and having a corresponding compressed character code, and a primitive database comprising a plurality of primitive types and each primitive type comprised of one or more stroke types that define simple graphical elements;

a controller coupled to the receiver and to the memory, the controller being programmed to:
(a) determine a compressed character codeword in the compressed character codeword database corresponding to the character code that is received;
(b) decode a structure type from the compressed character codeword determined in step (a) to determine a layout of an ideographic character;
(c) decode a remainder of the compressed character codeword depending on the structure type determined in step (b); and
(d) constructing the ideographic character corresponding to the at least one character code that is received based on information determined in steps (b) and (c).

10. The communication device of claim 9, wherein the controller is programmed in step (c), when the structure type determined in step (b) indicates that the compressed character codeword comprises one or more primitive types or compressed character indexes, to:

decode each primitive type to determine at least one stroke type defined by each; and decode each stroke type to determine at least one simple graphical element.

11. The communication device of claim 10, wherein the controller is further programmed in step (c), when the compressed character codeword corresponding to the at least one character code that is received includes at least one compressed character index corresponding to a constituent compressed character codeword, to decode the constituent compressed character codeword.

12. The communication device of claim 11, wherein the controller is further programmed in step (c) to decode the constituent compressed character codeword by:

determining a primitive type included in the constituent compressed character codeword;

decoding the primitive type to determine at least one stroke type defined by the primitive type; and decoding the at least one stroke type to determine at least one graphical element.

13. The communication device of claim 9, wherein the controller is further programmed in step (c), when the structure type determined in step (b) indicates that the compressed character codeword comprises at least one stroke type, to decode the at least one stroke type.

14. The communication device of claim 9, wherein the controller is further programmed in step(c), when the structure type determined in step (b) indicates that the compressed character codeword comprises bit map image data, to decode the bit map image data to generate data for drawing the ideographic character.

15. The communication device of claim 9, and further comprising a display coupled to the controller for displaying the ideographic character corresponding to the at least one character code that is received.

16. A method for generating compressed information representing ideographic characters of an ideographic character set, comprising steps of:

defining structure types representing layouts of simple graphical elements that make up the ideographic characters;

defining stroke types representing simple graphical elements used to draw ideographic characters;

defining primitive types representing a combination of stroke types;

examining an ideographic character;

determining a structure type for the ideographic character;

determining one or more primitive types for the ideographic character; and encoding a digital word to represent the ideographic character, including a portion thereof for the structure type and portions thereof for the one or more primitive types.

17. The method of claim 16, wherein the step of encoding further comprises encoding a portion thereof for one or more constituent ideographic characters.

18. The method of claim 16, wherein the step of encoding further comprises encoding portions thereof as uncompressed bit map image data to represent an ideographic character.

19. The method of claim 16, wherein the step of encoding comprises the step of encoding the portion for the structure type such that the structure type determines how remaining portions of the digital word is encoded.

* * * * *